United States Patent [19]

Buerger

[11] Patent Number: 5,031,965
[45] Date of Patent: Jul. 16, 1991

[54] DRESS WHEEL SIMULATOR

[75] Inventor: Michael H. Buerger, Hendersonville, Tenn.

[73] Assignee: Del-Met Corporation, Hendersonville, Tenn.

[21] Appl. No.: 483,748

[22] Filed: Feb. 23, 1990

[51] Int. Cl.$^5$ ............................................. B60B 7/06
[52] U.S. Cl. ................................. 301/37 S; 301/108 S
[58] Field of Search .............. 301/37 R, 37 S, 37 CM, 301/37 SC, 108 R, 108 S, 108 SC

[56] References Cited

U.S. PATENT DOCUMENTS

| | | |
|---|---|---|
| 1,959,255 | 5/1934 | Zerk . |
| 2,092,975 | 9/1937 | Hunt et al. . |
| 2,181,364 | 11/1939 | Burger . |
| 2,944,853 | 7/1960 | Lyon . |
| 3,092,421 | 6/1963 | Lyon ................................. 301/37 S |
| 3,288,488 | 11/1966 | Shinn . |
| 3,561,820 | 2/1971 | Chaivre ....................... 301/9 DN X |
| 3,653,719 | 4/1972 | Osawa et al. . |
| 4,240,670 | 12/1980 | Zorn et al. . |
| 4,606,582 | 8/1986 | Warren ............................. 301/37 S |
| 4,787,681 | 11/1988 | Wang et al. ...................... 301/37 S |
| 4,881,783 | 11/1989 | Campbell .......................... 301/37 S |
| 4,950,036 | 8/1990 | Patti ................................. 301/37 S |

FOREIGN PATENT DOCUMENTS 1327391 6/1970 United Kingdom .

Primary Examiner—Russell D. Stormer
Attorney, Agent, or Firm—Natter & Natter

[57] ABSTRACT

A dress wheel simulator for a truck or recreational vehicle wheel includes a stainless steel shell adapted to cover the outer face of the wheel from the wheel rim to a central wheel hub area. The simulator shell includes an enlarged opening in its wheel hub area with the opening being sufficiently large so as to permit the shell to pass axially over a majority of the wheel lugs with the lug nuts attached. A simulator hub cover having a radial flange with a plurality of lug nut openings and a pair of diametrically opposed lug openings is also provided. To mount the simulator, a pair of opposed lug nuts are removed, the shell is positioned against the wheel, the lug nut openings of the hub cover are registered with the lugs having their nuts removed and the lug nut openings are registered with the remaining lugs and the hub cover is passed axially over the lugs and lug nuts and against the shell. Thereafter, the lug nuts are reapplied and tightened to secure the simulator.

6 Claims, 4 Drawing Sheets

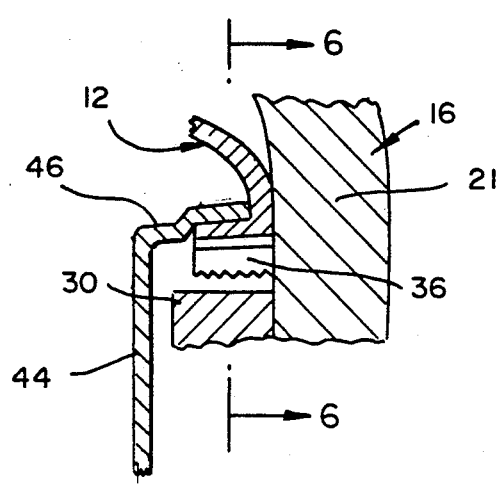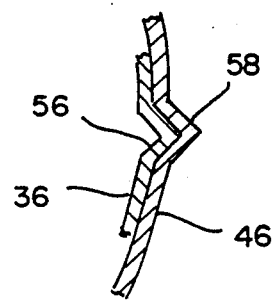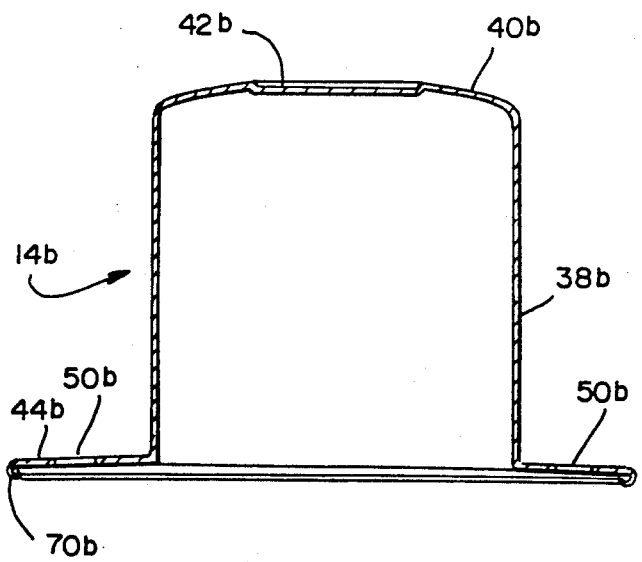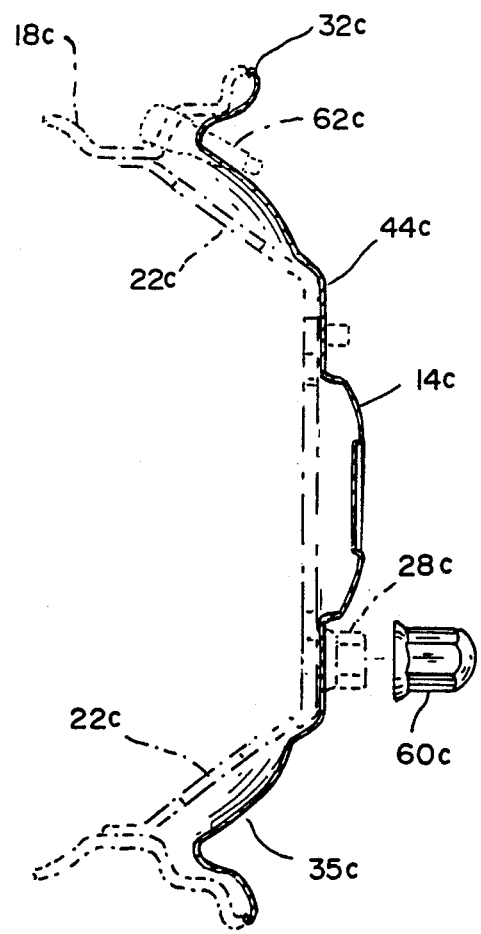

DRESS WHEEL SIMULATOR

BACKGROUND OF THE INVENTION

1. Field of the Invention

This invention relates generally to wheel covers for vehicle wheels and more particularly to a simulator which presents the appearance of a chromed dress wheel on a truck, utility or recreational vehicle.

2. History

Various problems have been encountered with respect to providing wheel covers for truck, utility and recreational vehicle wheels. It has been recognized, for example, that the use of conventional automobile wheel cover rim engaging fastening systems for truck or utility vehicle wheels was not practical. Mounting systems were devised which utilized existing wheel lugs and lug nuts to fasten wheel covers or wheel cover components for such applications.

In U.S. Pat. No. 4,606,582, a utility vehicle wheel cover which included a separate hub cover was disclosed. Both the wheel cover and the hub cover were provided with apertures which were registered with the vehicle's wheel lugs. To mount the wheel cover, the vehicle wheel was lifted from the ground, all wheel lug nuts and a factory equipped annular compression plate were removed, the wheel cover was slipped over the lugs, the compression plate reapplied and then the hub cover was slipped over the lugs and placed against the compression plate. All lug nuts were then secured to the lugs and tightened down against the hub cover.

Installation of such wheel covers was relatively difficult, time consuming and, since it required lifting the vehicle, also presented safety risks. In addition, the compression plate, which was designed to be utilized to apply an axial compressive force against the wheel itself, was now positioned between at least one wheel cover layer and the wheel. Further, the lug nuts, which were designed to be applied directly against the compression plate, were separated from the compression plate by the hub cover. Depending upon the hardness, thickness and other characteristics of the wheel cover material positioned between the wheel and the compression plate, as well as the compression plate and the lug nuts, interference with the wheel retention system including the intended application of wheel mounting compression forces resulted. In addition, the possibility of lug nuts backing off and working loose was presented since the lug nuts were not tightened against the compression plate.

SUMMARY OF THE INVENTION

A dress wheel simulator is configured to cover all exterior surfaces of a truck, utility, or recreational vehicle wheel. The simulator includes a skin or shell extending from the wheel rim to a hub area and having an enlarged opening in the hub area. The opening is configured to pass over at least a majority, if not all, of the vehicle wheel lugs and their attached associated lug nuts. For applications wherein a factory equipped compression plate is positioned against the wheel, the hub area opening larger than the compression plate is provided. A hub cover having a radial flange with a plurality of lug nut openings registered with the various wheel lugs is also provided. The hub cover openings are dimensioned sufficiently large to accommodate the wheel lugs with their lug nuts attached except for two opposed smaller openings which only accommodate lugs.

To mount the wheel simulator, two lug nuts are removed, the simulator shell is placed against the wheel. Thereafter, the smaller openings of the hub cover are registered with the lugs without the nuts and the hub cover is slipped over all the lugs. The two lug nuts are reattached to their lugs and tightened down against the hub cover. Suitable oversized lug nut covers are then slipped over all of the lug nuts with the nut covers having a major diameter greater than the diameter of the lug nut openings in the hub cover.

In the embodiment wherein a single opening is provided through the wheel simulator shell to accommodate a compression plate, a shell flange extends axially outward. The flange includes a plurality of spaced radially projecting teeth. In addition, the hub cover includes an axial flange which has mating teeth. Interlocking engagement of the simulator shell and hub cover teeth prevent rotation of the simulator shell while the peripheral edge of the axial hub cover flange bears against the simulator shell and forces it against the wheel.

In an alternate embodiment, suitable for use in applications without compression plates, the simulator shell includes a planar hub area which engages the wheel hub directly. A pair of diametrically opposed openings only accommodate a pair of lugs while the enlarged opening accommodates lugs with lug nuts.

Also provided is a one piece wheel simulator for front wheel applications wherein all except two openings accommodate lugs with nuts attached and the simulator is secured utilizing two lug nuts.

From the foregoing compendium, it will be appreciated that it is in consideration of the present invention to provide a dress wheel simulator of the general character described which is not subject to the disadvantages of the background history aforementioned.

It is an aspect of the present invention to provide a dress wheel simulator of the general character described having a mounting system which facilitates rapid mounting and dismounting of the simulator to and from a utility vehicle wheel.

A feature of the present invention is to provide a dress wheel simulator of the general character described which conforms with factory specifications for wheel mounting.

Yet another consideration of the present invention is to provide a dress wheel simulator of the general character described which utilizes wheel lug nuts for attachment without requiring lifting a vehicle wheel.

A further feature of the present invention is to provide a dress wheel simulator of the general character described which is relatively low in cost and suitable for economical mass production fabrication.

To provide a dress wheel simulator of the general character described with minimal component weight is yet another consideration of the present invention.

A still further aspect of the present invention is to provide a dress wheel simulator of the general character described which may be mounted to a vehicle wheel without requiring removal of a factory equipped wheel mounting compression plate.

Other aspects, features and considerations in part will be obvious and in part will be pointed out hereinafter.

With these ends in view, the invention finds embodiment in certain combinations of elements, arrangements and parts and series of steps by which the said aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which are shown some of the various exemplary embodiments of the invention.

FIG. 5 is a fragmentary sectional view of the wheel simulator shell and the hub cover as illustrated in FIG. 3, the same being greatly magnified, however, to illustrate the interengagement between mating teeth formed as projections in annular axial flanges of the wheel simulator shell and the wheel simulator hub cover;

FIG. 6 is an enlarged scale fragmentary sectional view of the wheel simulator and wheel simulator hub cover, the same being taken substantially along the plane 6—6 of FIG. 5.

FIG. 9 is a sectional view through a wheel simulator hub cover depicted in FIG. 8, the same being taken substantially along the plane 9—9 of FIG. 8; and FIG. 10 is a sectional view through the wheel and one piece wheel simulator depicted in FIG. 7, the same being taken substantially along the plane 10—10 of FIG. 7 and showing, in exploded format, the application of a lug nut cover.

DESCRIPTION OF THE PREFERRED EMBODIMENTS

Figure 1:
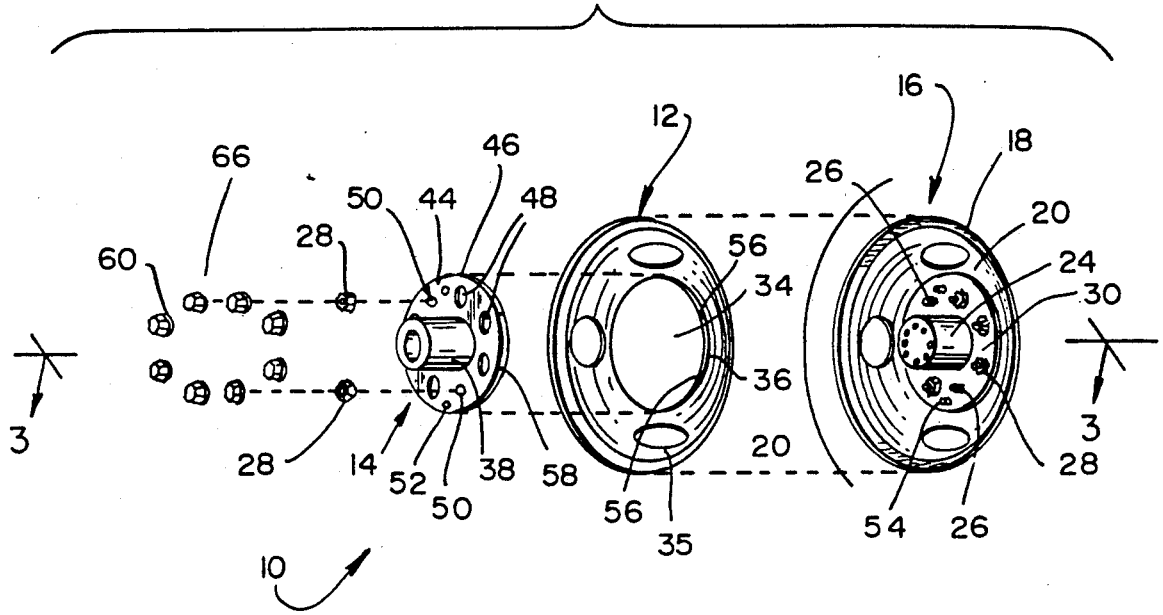
FIG. 1 is a perspective view of a right rear wheel of a utility vehicle and showing, in exploded format, the manner in which a wheel simulator shell and wheel simulator hub cover constructed in accordance with the invention are mounted to the wheel utilizing a pair of diametrically opposed wheel mounting lugs.

Referring now in detail to the drawings wherein like numerals refer to like components in the various figures, the reference numeral 10 denotes generally a wheel simulator constructed in accordance with and embodying the invention. The wheel simulator 10 comprises a wheel simulator shell 12 and a simulator hub cover 14. In accordance with the invention, the simulator 10 is adapted to be mounted to and cover the axially exterior surfaces, i.e. the outer face, of a steel utility vehicle wheel 16.

The wheel 16 is of conventional construction and includes a rim 18 and a dished web 20 which extends from a planar hub ring 21 to the rim 18. A plurality of spaced openings 22 are provided in the web for cooling and for access to inflation valve stems. The wheel 16 is mounted to a vehicle axle having a hub 24 through a plurality of wheel lugs 26 which carry conventional lug nuts 28.

Pursuant to vehicle manufacturer specifications for the wheel application depicted in FIG. 1, an annular compression plate 30 is positioned between the lug nuts 28 and the hub ring 21 of the wheel 16 for evenly distributing the compressive mounting force applied by the lug nuts 28 and for reducing the possibility of the lug nuts working loose.

In accordance with the invention, the simulator shell 12 is preferably formed of a single piece of stainless steel or like material and is configured in conformity with the dished shape of the wheel 18. To eliminate sharp edges which might damage the side wall of a tire mounted to the rim 18 as well as to prevent injury to persons involved in mounting or dismounting the simulator or wheel, the shell 12 includes an interned peripheral lip 32 overlying the rim 18 at its major diameter. Openings 35 are provided through the shell 12 in registration with the wheel web openings 22.

Figure 3:
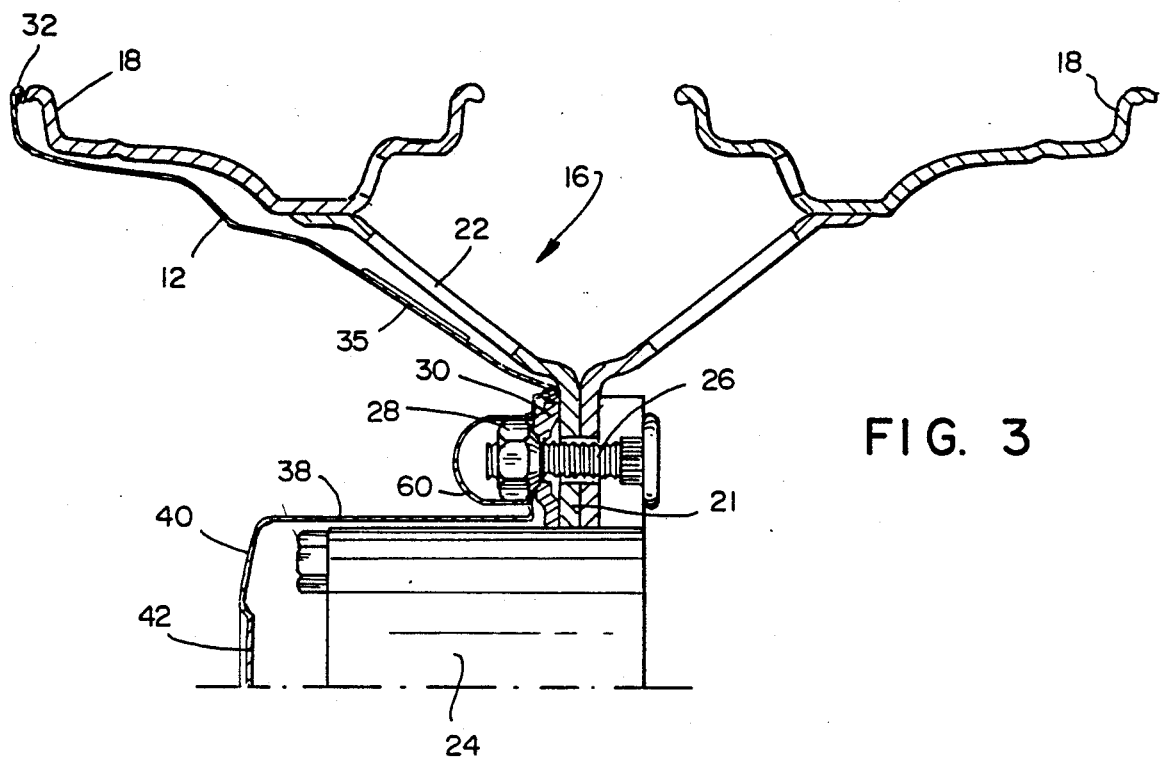
FIG. 3 is an enlarged scale fragmentary vertical sectional view through the wheel and wheel simulator illustrated in FIG. 1, the same being taken substantially along the plane 3—3 of FIG. 1 with the simulator mounted.
Figure 4:
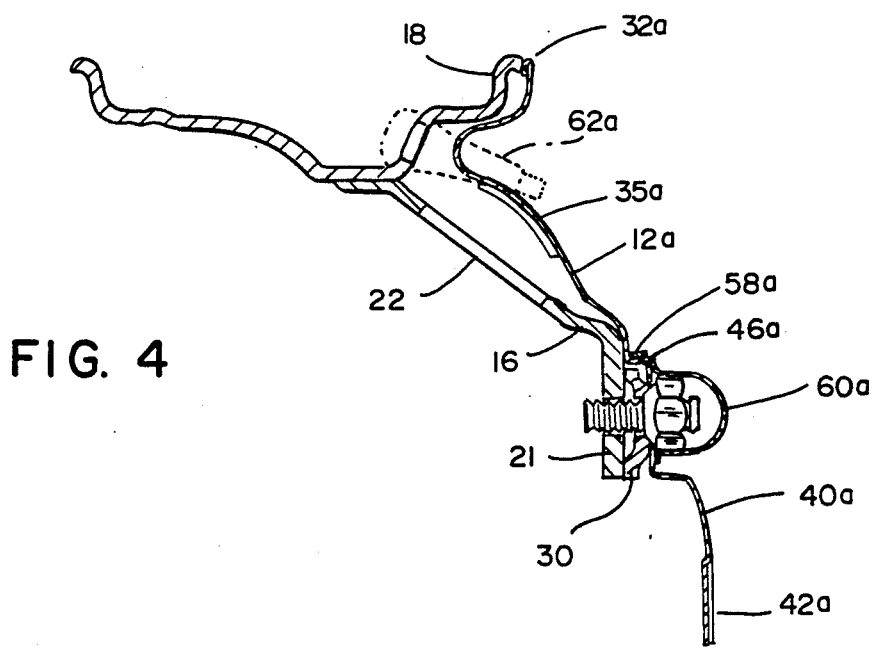
FIG. 4 is an enlarged scale fragmentary sectional view through the front wheel illustrated in FIG. 2, the same being taken substantially along the line 4—4 of FIG. 2 with the simulator mounted.

As illustrated in FIGS. 3 and 5, the profile of the simulator shell 12 substantially traces that of the wheel 16 yet, at all times, is preferably spaced from the rim 18 and web 16 so that contact with the wheel is only made at the hub ring 21 and adjacent a central hub opening 34. The hub opening 34 is of a diameter greater than the diameter of the compression plate 30 and includes an annular flange 36 which extends axially outwardly.

The hub cover 14 includes a cylindrical body 38 and a capped end 40 having a suitable central indentation 42 for accommodating an ornament or the like. The hub cover 14 also includes a planar radial flange 44 which extends from the base of the body 38. The flange 44 terminates at an axial annular flange 46 having a diameter larger than the diameter of the axial flange 36 of the simulator shell 12.

In accordance with the invention, the radial flange 44 is provided with a plurality of lug nut openings 48 each having a diameter suitable for passing the flange 44 over mounted lug nuts 28 without interference. In addition, the flange 44 is provided with a pair of smaller diameter opposed lug openings 50 which are suitable for passing the flange 44 over a pair of lugs 26 only after the lug nuts have been removed. Further pin openings 52 may be provided through the flange 44 for accommodating pins 54 which project through the compression plate 30.

To mount the simulator 10, two diametrically opposed lug nuts are removed from the appropriate lugs, e.g. the lugs adjacent the pins 54, the simulator shell 12 is placed against the hub ring 21 of the wheel 16 and then the lug openings 50 of the hub cover 14 are registered with the appropriate lugs, the hub cover is slipped over the hub and the lug nuts are placed in engagement with their respective lugs and tightened down.

Tightening the lug nuts 28 urges the hub cover 14 toward the wheel 16 and against the compression plate. In addition, it will be seen from FIG. 3 that the conical end surfaces of the lug nuts fully seat in the mating conical openings of the compression plate 30. Since the lug openings 50 having a diameter at least as great as the maximum conical diameter of a compression plate lug opening, no interference with lug nut compression plate engagement results.

Because the axial flange 46 of the hub cover 14 is of a larger diameter than the axial flange 36 of the simulator shell, it overlies the shell flange 36. In addition, since the axial length of the flange 46 is at least the thickness of the compression plate 30, the peripheral edge of the flange 46 engages the simulator shell adjacent the base of the simulator flange 36, as depicted in FIG. 5. Such engagement forces the simulator shell against the hub ring 21 of the wheel 16 to maintain the simulator shell 12 in position.

A plurality of radially projecting teeth 56 are formed in the shell flange 36 and mating teeth 58 are formed in the cover flange 46. Mutual engagement between the teeth 56, 58 prevent rotation of the simulator shell 12 relative to the wheel. Mating teeth 56, 58 may be equidistantly spaced around the periphery of the flanges 36, 46.

After the two lug nuts have been tightened against the flange 44 of the hub cover and against the compression plate 30, all of the exposed lug nuts are covered with conventional snap-on lug nut covers 60. As illustrated in FIG. 3, the lug nut covers may be acorn shaped and include an outwardly flared base. The diameter of the base of the nut covers is greater than the diameter of the lug nut openings 48 and will thus cover the lug openings 50 as well as the lug nut openings 48.

Figure 2:
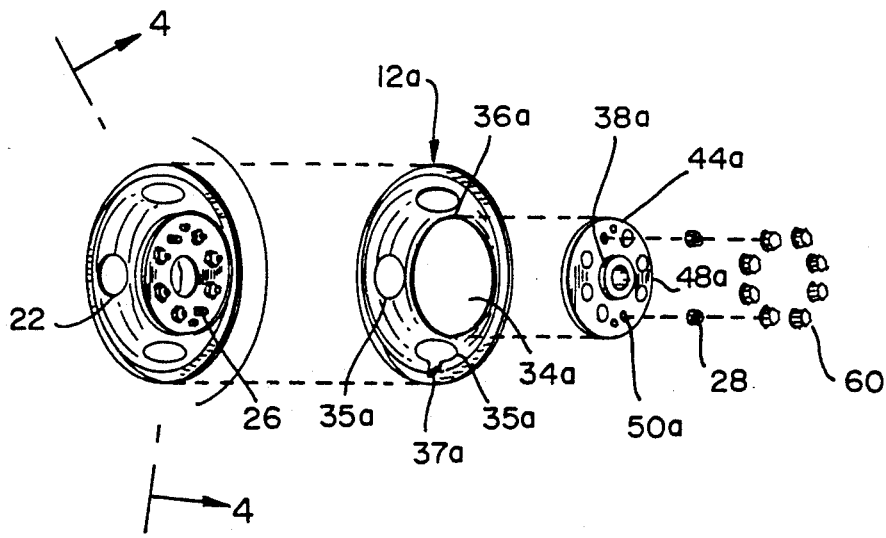
FIG. 2 is a perspective view of a right front wheel of the utility vehicle and showing, in exploded format, the manner in which a wheel simulator shell and wheel simulator hub cover are mounted to the wheel utilizing a pair of diametrically opposed lugs.

Turning now to FIG. 2 wherein an alternate embodiment of a simulator 10a suitable for covering a front wheel 16a is illustrated, it should be noted that the front wheel 16a is, in actuality, the same wheel as the rear wheel however, it is mounted to the vehicle axle with its opposite face outward.

The wheel simulator 10a includes a simulator shell 12a and a simulator hub cover 14a. As with the prior embodiment, the simulator shell 12a is preferably formed of a single piece of stainless steel and is configured in conformity with the shape of the wheel. While the rear wheel simulator 10 included a shell 12 which was convex facing outwardly, the simulator shell 12a is concave.

As with the prior embodiment, the shell 12a includes an interned lip 32a at its periphery and also includes a plurality of openings 35a for registration with openings 22a of the wheel web. It will be noted that one of the openings 35a includes a radial extension 37a for accommodating an inflation valve stem 62a. The simulator shell 12a includes a central hub opening 34a which is bordered by an axial flange 36a, substantially identical to the flange 36.

The hub cover 14a includes a cylindrical body area of reduced axial length. In all other respects, however, the hub cover 14a is identical to the hub cover 14 and includes a radial flange 44a having lug openings 50a for accommodating a pair of diametrically opposed lugs without nuts and a plurality of lug nut openings 48a of larger diameter. In addition, the axial flange 36a of the simulator shell 12a and an axial flange 46a of the hub cover both include mating teeth 56a, 58a for mutual engagement in the manner identical to that of the previous embodiment.

Figure 7:
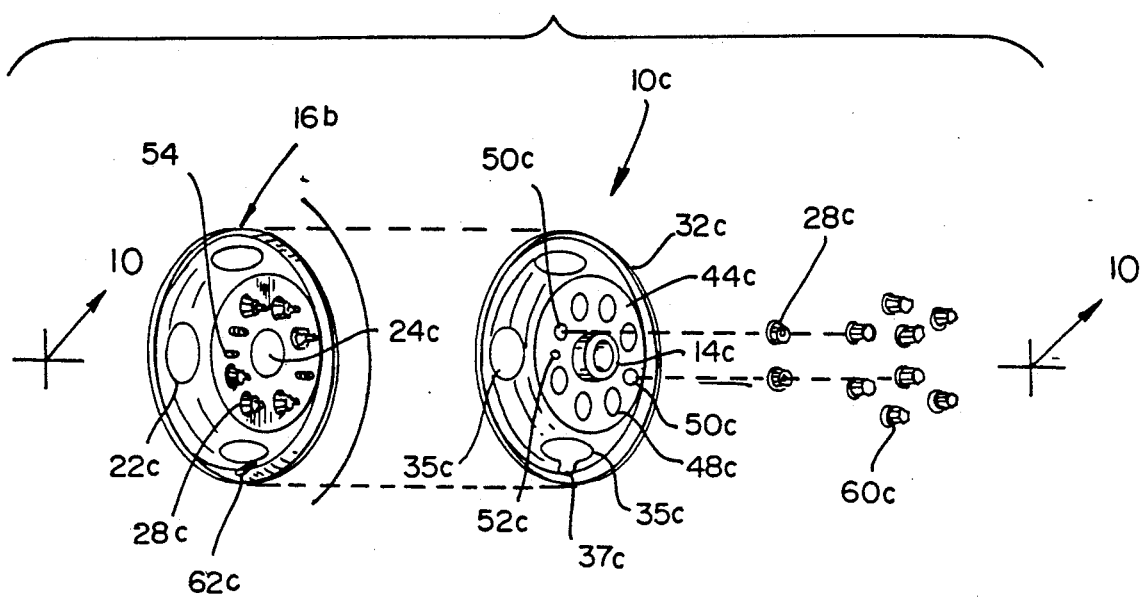
FIG. 7 is a perspective view of a utility vehicle right front wheel and showing, in exploded format, a one piece wheel simulator suitable for applications without factory equipped compression plates.
Figure 8:
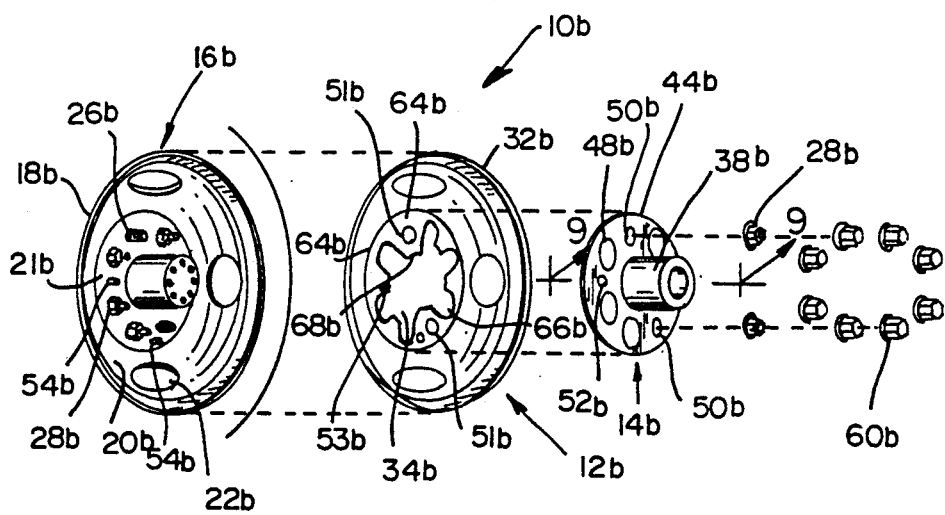
FIG. 8 is a further perspective view, the same being taken of the right rear wheel of the same vehicle and showing a further embodiment of the invention wherein the vehicle wheel application does not utilize a compression plate.

Illustrated in FIGS. 7 and 8 are further embodiments of the invention which are suitable for mounting to utility vehicle wheels which are not equipped with compression plates. Accordingly, the wheel simulator does not require axial flanges for accommodating the space occupied by the thickness of the compression plate and for interlocking a shell with a hub cover.

Illustrated in FIG. 8 is a right rear wheel 16b of a utility vehicle and a wheel simulator 10b generally comprised of a simulator shell 12b and a simulator hub cover 14b. The wheel 16b is of conventional construction and includes a rim 18b, a web area 20b and a hub ring 21b. The web 20b includes a plurality of openings 22b. As with the prior embodiment, the wheel 16b is mounted to a vehicle axle having a hub 24b with a plurality of wheel lugs 26b which receive conventional lug nuts 28b having flat ends.

The simulator shell 12b is preferably formed of a single piece of stainless steel configured in conformity with the shape of the wheel 18b and having an interned peripheral lip 32b at its major diameter. As with prior embodiments, the profile of the simulator shell 12b substantially traces that of the wheel 16b yet is preferably spaced from the rim and web areas 16b, 20b so that contact with the wheel is only made at a hub ring 21b adjacent a non circular central opening 34b which is cut out of a generally planar central hub panel 64b.

It should be noted that the central opening 34b includes radially projecting cut out lug nut fingers 66b which permit the hub panel 64b to pass over the lug nuts 28b without interference. Additionally, two diametrically opposed segments 68b of the hub panel 64b project radially inwardly and are each provided with a lug opening 51b. The lug openings 51b are of a diameter suitable for permitting the hub panel 64b to pass over a pair of diametrically opposed lugs from which the associated lug nuts have been removed. In addition, the hub panel 64b may also includes a plurality of pin openings 53b suitable for accommodating pins 54b which project from the axle.

The hub cover 14b is similar in configuration to the hub cover 14 previously described and includes a cylindrical body 38b configured to overly the hub 24b and a capped end 40b having a central indentation 42b. The hub cover 14b also includes a generally planar radial flange 44b which extends from the base of the body 38b and terminates with an interned lip 70b illustrated in FIG. 9.

The radial flange 44b includes a plurality of lug nut openings 48b each having a diameter suitable for passing over lug nuts 28b and a pair of opposed lug openings 50b of smaller diameter and which are suitable for passing the flange 44b over a pair of diametrically opposed lugs 26b from which the associated lug nuts have been removed. As with the prior embodiments, additional openings 52b may be provided to accommodate the pins 54b.

To mount the simulator 10b, the lug nuts 28b are removed from the appropriate two diametrically opposed lugs and the simulator shell hub panel 64b is placed against the hub ring 21b of the wheel after the openings 51b are registered with the lugs having the lug nuts removed. The hub cover 14b is registered with the lug pattern and its flange 44b is slipped over the appropriate lugs. The lug nuts 28b are placed in engagement with their respective opposed lugs and tightened. The tightening of the lug nuts 28b urges that the hub cover flange 44b and the hub panel 64b of the shell 12b against the hub ring 21b of the wheel. Thereafter, lug nut covers 60b are placed over all lug nuts 28b.

A one piece simulator 10c for covering a front wheel 16c of a vehicle which is not equipped with wheel mounting compression plates is illustrated in FIGS. 7 and 10. The simulator 10c includes a shell 12c having an interned peripheral lip 32c and a plurality of openings 35c for registration with a plurality of openings 22c of a wheel web 18c. One of the openings 35c includes a radial extension 37c for accommodating an inflation valve stem 62c.

A hub cover portion 14c unitary with the simulator 10c includes a radial flange 44c having a plurality of lug openings 50c for accommodating opposed lugs without lug nuts and a plurality of lug nut openings 48c of larger diameter which permit the simulator 10c to be slipped over the lugs without removing all of the lug nuts. The hub flange 44c may also include a pin opening 52c for accommodating a pin 54 which may project from a vehicle axle hub 42c.

It should be noted that the wheel 16c is mounted utilizing a plurality of lug nuts 28c which are not tapered at their ends but have flat ends. The lug nuts 28c which are removed for mounting the simulator 10c are reengaged on their lugs and bear directly against the simulator for mounting purposes and for securement of the wheel 16c. Thereafter, all of the lug nuts 28c are covered Thus it will be seen that there is provided a dress wheel simulator which achieves the various aspects, features and considerations of the present invention and which is well suited to meet the conditions of practical usage.

Since various possible embodiments might be made of the present invention and various changes might be made in the exemplary embodiments set forth herein, it is to be understood that all matter herein described or shown in the accompanying drawing should be interpreted as illustrative and not in a limiting sense.

Having thus described the invention there is claimed as new and desired to be secured by Letters Patent:

1. A dress wheel simulator for a utility vehicle wheel mounted to a wheel hub having a plurality of lugs which pass through openings in the wheel, the wheel having an associated compression plate for mounting purposes, the lugs pressing through openings in the compression plate and wheel lug nuts engaging the compression plate to mount the wheel to the hub, the simulator comprising a shell adapted to cover an outer face of the wheel from a maximum diameter at a wheel rim to a wheel hub area, the simulator substantially conforming to the contour of the wheel, the shell including a hub area having a substantially circular opening, the opening in the hub area of the shell being larger than the corresponding dimensions of the compression plate, the shell including an axial flange along the periphery of the hub area opening, the shell axial flange extending outwardly, the simulator further including a hub cover, the hub cover having an integral radial flange, the flange having a plurality of lug nut openings, each lug nut opening being dimensioned to permit the flange to pass axially over the lugs with the lug nuts attached, the flange further including at least one lug opening, the lug opening being so dimensioned as to permit the flange to pass axially over a selected lug only after removal of its associated lug nut, the hub cover including a peripheral axial flange, the hub cover axial flange engaging the hub area of the shell to mount the shell to the wheel the hub cover axial flange extending inwardly and being in nested engagement over the shell axial flange when the simulator is mounted, the simulator further including interlocking means associated with the axial flanges for preventing rotation of the shell relative to the wheel, the interlocking means for preventing rotation including radial teeth on the hub cover axial flange, the teeth comprising radially outwardly struck areas extending from the periphery of the axial flange axially toward the hub cover radial flange, the teeth defining hollow axial channels on the inner face of the hub cover axial flange, the means for preventing rotation further including outwardly struck areas on the shell axial flange, the outwardly struck areas forming teeth, the shell axial flange teeth extending axially from the periphery of the shell axial flange toward the shell hub area, the teeth of the shell axial flange being registered with the teeth of the hub cover axial flange, the hub cover axial flange being nestable over the shell axial flange with the teeth of the shell axial flange seated within the channels on the inner face of the hub cover axial flange, whereby the simulator may be mounted to a vehicle wheel after removal of the lug nut of the selected lug and may be secured by reapplying the lug nut to the selected lug after the shell and hub cover flange have been positioned and interlocked.

2. A dress wheel simulator for a utility vehicle wheel as constructed in accordance with claim 1 wherein the hub cover flange includes two lug openings, the lug openings being diametrically opposed.

3. A dress wheel simulator for a utility vehicle wheel as constructed in accordance with claim 1 further including a plurality of lug nut covers, the lug nut covers being dimensioned larger than the lug nut openings in the hub cover flange whereby the lug nut openings are concealed.

4. A dress wheel simulator for a utility vehicle wheel as constructed in accordance with claim 1 wherein the shell and the hub cover are formed of stainless steel.

5. A dress wheel simulator for application to a utility vehicle wheel having an axle hub with a plurality of lugs, the wheel having a hub ring with a plurality of openings, the lugs extending through the openings of the wheel hub ring when the wheel is mounted, the simulator comprising a shell dimensioned to overlie the outer face of the wheel, the shell including a generally planar hub area having a noncircular opening, the noncircular opening including a plurality of radial cutouts, the cutouts being positioned in registry with a plurality of wheel lugs with lug nuts applied and being dimensioned larger than the lug nuts to permit the shell to be passed axially through the lugs with lug nuts applied to position the shell against the wheel, the noncircular opening including a plurality of radially inward projections wherein the hub area has not been removed, the radially inward projections including lug openings in registry with selected lugs, the lug openings being dimensioned to permit the hub area to e displaced axially over the selected lugs with their lug nuts removed and through such lug openings, the clearance between the lug openings and the lugs being such to preclude rotation of the shell relative to the wheel, the wheel simulator further including a hub cover, the hub cover including a radial flange having a plurality of lug nut openings, the lug nut openings being dimensioned to permit lugs with lug nuts attached to pass axially therethrough, the flange further including a plurality of lug openings, the lug openings corresponding to the lug openings in the radially inward projections of the hub area and being dimensioned to permit lugs with lug nuts removed to extend therethrough, the clearance between the flange lug openings and the lugs being such to preclude rotation of the hub cover relative to the wheel, at least a portion of the hub cover flange axially overlying the noncircular opening when the simulator is mounted.

6. A dress wheel simulator for a utility vehicle wheel mounted to a wheel hub having a plurality of lugs which pass through openings in the wheel, the simulator comprising a shell adapted to cover an outer face of the wheel from a maximum diameter at a wheel rim to a generally planar wheel hub area, the simulator substantially conforming to the contour of the wheel, the shell including a hub area having a noncircular opening, the opening being of a size sufficient to permit the shell hub area to pass axially over at least a majority of the lugs with lug nuts attached, the hub area opening including a plurality of radial cutouts, the cutouts being registered with the majority of wheel lugs with lug nuts attached, the shell hub area including at least one segment which projects into the opening, the segment including a wheel lug opening therein, the wheel lug opening having a diameter suitable to permit the shell hub area to pass axially over a selected wheel lug only after removal of its lug nut, the simulator further including a hub cover, the hub cover having an integral radial flange, the flange having a plurality of lug nut openings, each lug nut opening being dimensioned to permit the flange to pass axially over the lugs with the lug nuts attached, the flange further including at least one lug opening, the lug opening being so dimensioned as to permit the flange to pass axially over the selected lug only after removal of its lug nut, whereby the simulator may be mounted to a vehicle wheel after removal of the one lug nut with at least a portion of the hub cover flange axially overlying at least a portion of the shell hub area and may be secured by reapplying the one lug nut to the selected lug after the shell and hub cover flange have been positioned.

* * * * *